(12) United States Patent
Abrari

(10) Patent No.: US 10,458,242 B2
(45) Date of Patent: Oct. 29, 2019

(54) ROTOR DISC WITH PASSAGES

(71) Applicant: PRATT & WHITNEY CANADA CORP., Longueuil (CA)

(72) Inventor: Farid Abrari, Mississauga (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 341 days.

(21) Appl. No.: 15/333,916

(22) Filed: Oct. 25, 2016

(65) Prior Publication Data

US 2018/0112531 A1    Apr. 26, 2018

(51) Int. Cl.
| | |
|---|---|
| F01D 5/08 | (2006.01) |
| F01D 5/02 | (2006.01) |
| B33Y 10/00 | (2015.01) |
| B33Y 80/00 | (2015.01) |
| B22F 3/15 | (2006.01) |
| B22F 5/00 | (2006.01) |
| F01D 5/34 | (2006.01) |
| F01D 5/04 | (2006.01) |

(52) U.S. Cl.
CPC ............... *F01D 5/02* (2013.01); *B22F 3/15* (2013.01); *B22F 5/009* (2013.01); *B33Y 10/00* (2014.12); *B33Y 80/00* (2014.12); *F01D 5/046* (2013.01); *F01D 5/34* (2013.01); *B22F 2998/10* (2013.01); *F01D 5/081* (2013.01); *F01D 5/082* (2013.01); *F01D 5/087* (2013.01); *F05D 2220/32* (2013.01); *F05D 2230/42* (2013.01); *F05D 2230/50* (2013.01); *F05D 2240/30* (2013.01); *F05D 2250/14* (2013.01); *F05D 2250/25* (2013.01); *Y02P 10/295* (2015.11)

(58) Field of Classification Search
CPC ...................... F01D 5/081–087; F04D 29/321
See application file for complete search history.

(56) References Cited

U.S. PATENT DOCUMENTS

| | | | | |
|---|---|---|---|---|
| 2,657,902 A | * | 11/1953 | Williams | F01D 5/021 29/889.2 |
| 4,102,603 A | * | 7/1978 | Smith | F01D 5/021 416/229 A |
| 4,522,562 A | * | 6/1985 | Glowacki | B23H 9/10 415/116 |
| 5,957,660 A | * | 9/1999 | Evans | F01D 5/084 415/115 |
| 6,022,190 A | * | 2/2000 | Schillinger | F01D 5/081 415/115 |

(Continued)

FOREIGN PATENT DOCUMENTS

| | | | | | |
|---|---|---|---|---|---|
| GB | 512301 A | * | 8/1939 | ............. | F01D 5/087 |
| GB | 761380 A | * | 11/1956 | ............. | F01D 5/081 |

*Primary Examiner* — Carlos A Rivera
*Assistant Examiner* — Behnoush Haghighian
(74) *Attorney, Agent, or Firm* — Norton Rose Fulbright Canada L.L.P.

(57) ABSTRACT

A rotor disc for a gas turbine engine includes an annular disc body configured to support a circumferential array of blades and having a plurality of passages defined therethrough. The passages form coils within the disc body and/or have a packing density of at least 0.1 in cross-sectional plane containing the central axis, the packing density being defined by a ratio between an open area of the passages and a solid area of the disc in the cross-sectional plane. A method of manufacturing a rotor disc is also discussed.

15 Claims, 6 Drawing Sheets

(56) References Cited

U.S. PATENT DOCUMENTS

| | | | |
|---|---|---|---|
| 7,329,086 B2 * | 2/2008 | Wiebe | F01D 5/081 |
| | | | 415/115 |
| 7,872,472 B2 | 1/2011 | Suzuki et al. | |
| 8,281,486 B2 * | 10/2012 | Storch | B23C 3/34 |
| | | | 29/889 |
| 8,348,615 B2 | 1/2013 | Bluck et al. | |
| 8,556,576 B2 * | 10/2013 | Wilson, Jr. | F01D 5/081 |
| | | | 415/115 |
| 9,476,305 B2 * | 10/2016 | Jan | F01D 5/081 |
| 10,024,170 B1 * | 7/2018 | Memmen | F01D 5/186 |
| 10,161,251 B2 * | 12/2018 | Bintz | F01D 5/081 |
| 2012/0070310 A1 | 3/2012 | Ahmad | |

* cited by examiner

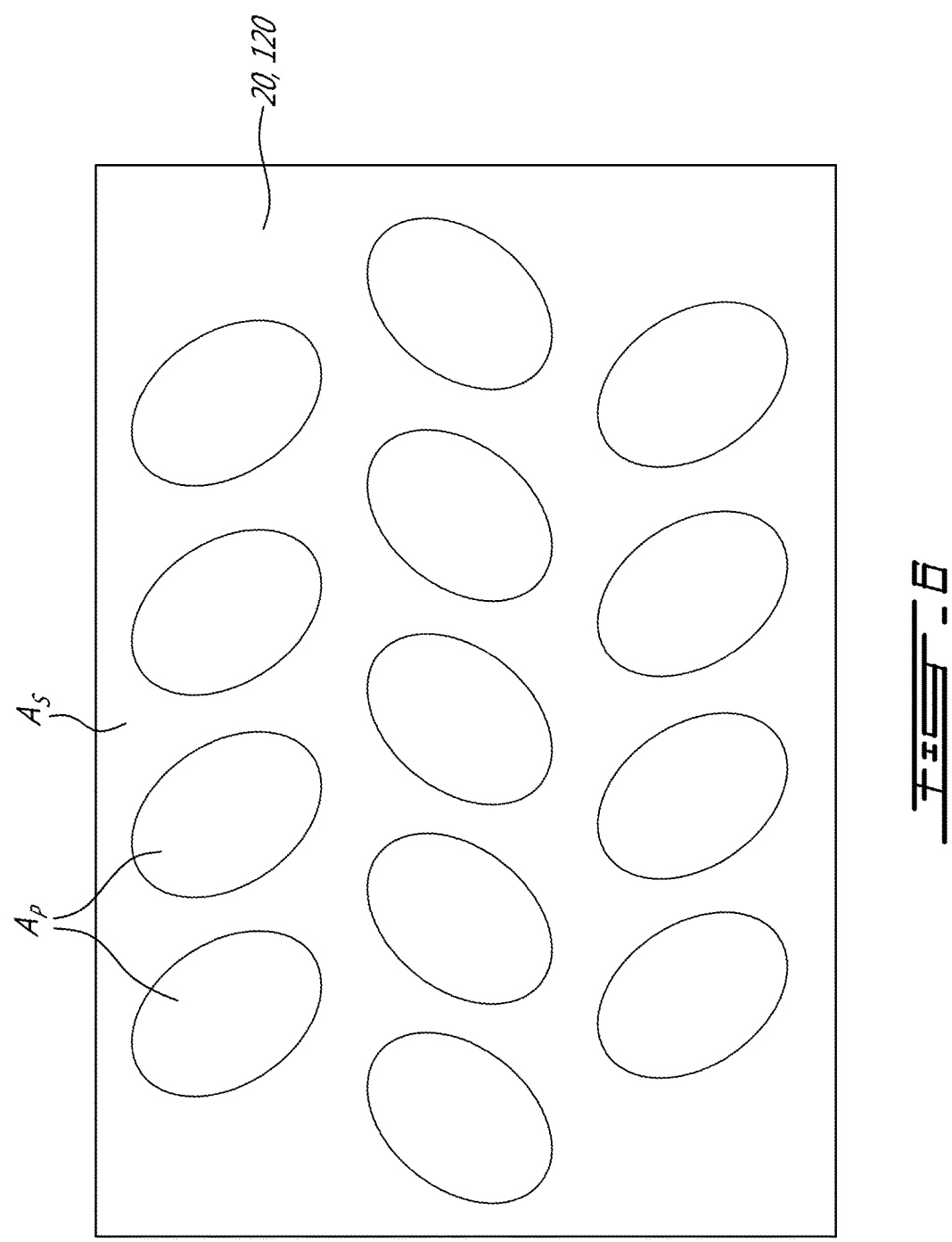

ROTOR DISC WITH PASSAGES

TECHNICAL FIELD

The application relates generally to gas turbine engines and, more particularly, to rotor discs for such engines.

BACKGROUND OF THE ART

Some rotors of gas turbine engines are characterized as critical rotating components based on a consideration that the rupture of such rotors could be associated with an unacceptable risk that the released high energy rotor fragment(s) would not be contained by the surrounding engine casing. Accordingly, such rotors are designed to minimize the risk of rupture and of high energy fragment release, and thus manufactured from materials meeting relatively stringent mechanical property requirements so as to ensure adequate fatigue and damage tolerance capabilities. However, materials that meet more stringent mechanical properties requirements can be more costly. Moreover, ensuring that released fragments are contained typically requires increasing the thickness of the casing, which adds weight to the engine.

SUMMARY

In one aspect, there is provided a rotor disc for a gas turbine engine, the rotor disc comprising an annular disc body configured to support a circumferential array of blades, the disc body having a plurality of passages defined therethrough forming coils within the disc body, the passages coiled around a central axis of the disc body.

In another aspect, there is provided a rotor disc for a gas turbine engine, the rotor disc comprising an annular disc body configured to support a circumferential array of blades, the disc body having a plurality of passages defined therethrough, the passages having a packing density of at least 0.1 in cross-sectional plane containing the central axis, the packing density defined by a ratio between an open area of the passages and a solid area of the disc in the cross-sectional plane.

In a further aspect, there is provided a method of manufacturing a rotor disc for a gas turbine engine, the method comprising forming an annular disc body by additive manufacturing, including forming passages extending through the disc body and forming openings in one or more of exterior surfaces of the disc, the openings defining opposed ends of the passages, wherein forming the passages includes reducing an effective mass density of the disc by at least 10% of a density of a material forming the disc body, the effective mass density being defined as a mass of the disc divided by a volume enclosed by the exterior surfaces of the disc.

DESCRIPTION OF THE DRAWINGS

Reference is now made to the accompanying figures in which:

FIG. 6 is a schematic partial cross-sectional view of the rotor disc of FIG. 2a or 2b.

DETAILED DESCRIPTION

Figure 1:
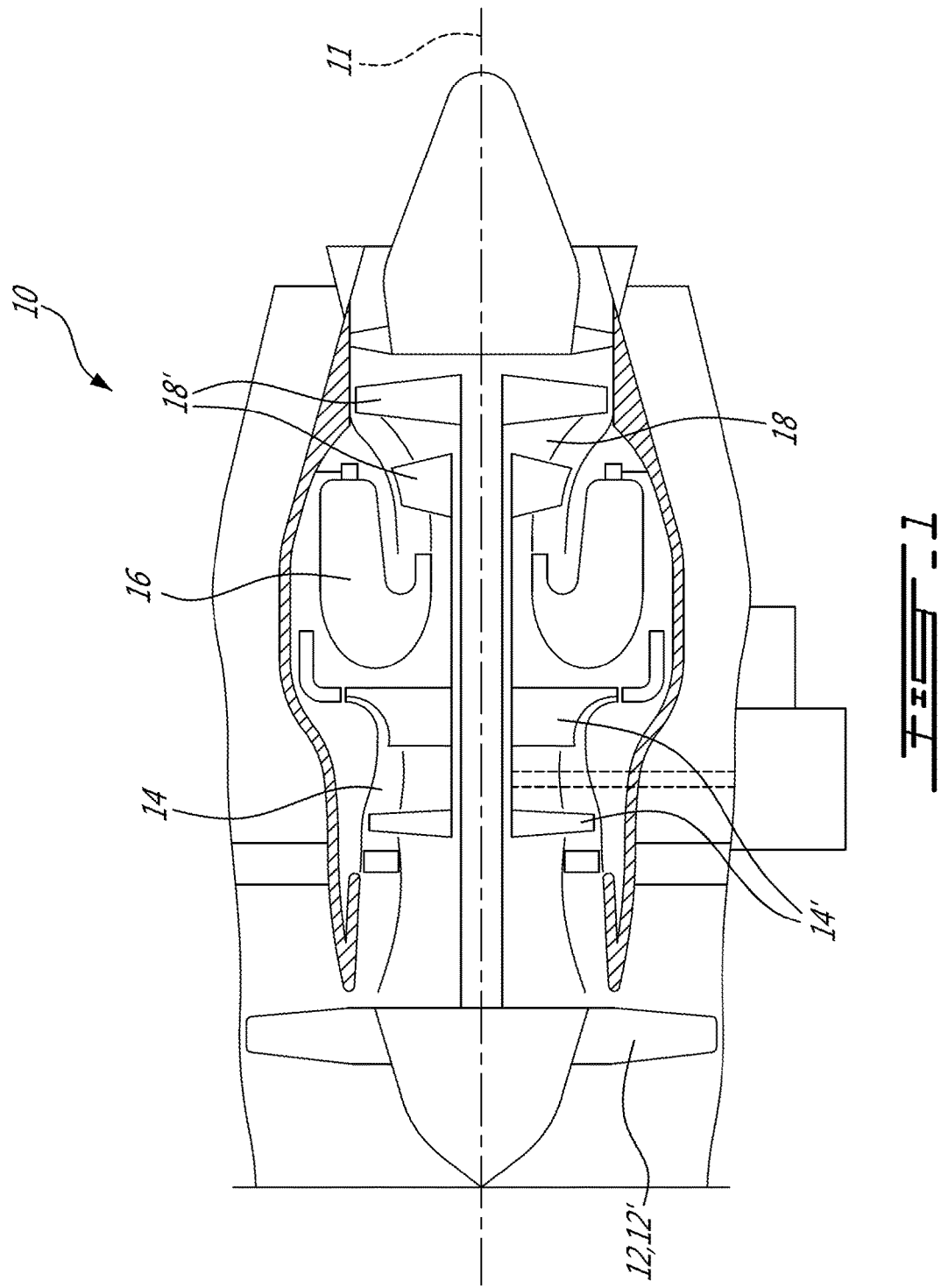
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Although the engine 10 has been shown as a turbofan, it is understood that the engine 10 may have any other suitable configuration, including a turboshaft configuration where the fan is omitted and the engine 10 drives an output shaft, and a turboprop configuration where the fan is omitted and the engine 10 drives a propeller. For example, in a particular embodiment, the engine 10 is a turboshaft engine used as an auxiliary power unit (APU). Other configurations are also possible.

The engine 10 includes a plurality of rotors, for example turbine rotors 18' in the turbine section 18, compressor rotors 14' in the compressor section 14, and a fan rotor 12'. Each rotor 12', 14', 18' generally includes a rotor disc and a circumferential array of blades extending from the disc along the flow path of the engine 10. The blades may be integrally connected to the rotor disc (for example, in a monolithic configuration known as integrally bladed rotor) or may be removably connected to the rotor disc through any suitable type of connection (e.g. fir tree blade root received in a complementary slot of the rotor disc).

Figure 2A:
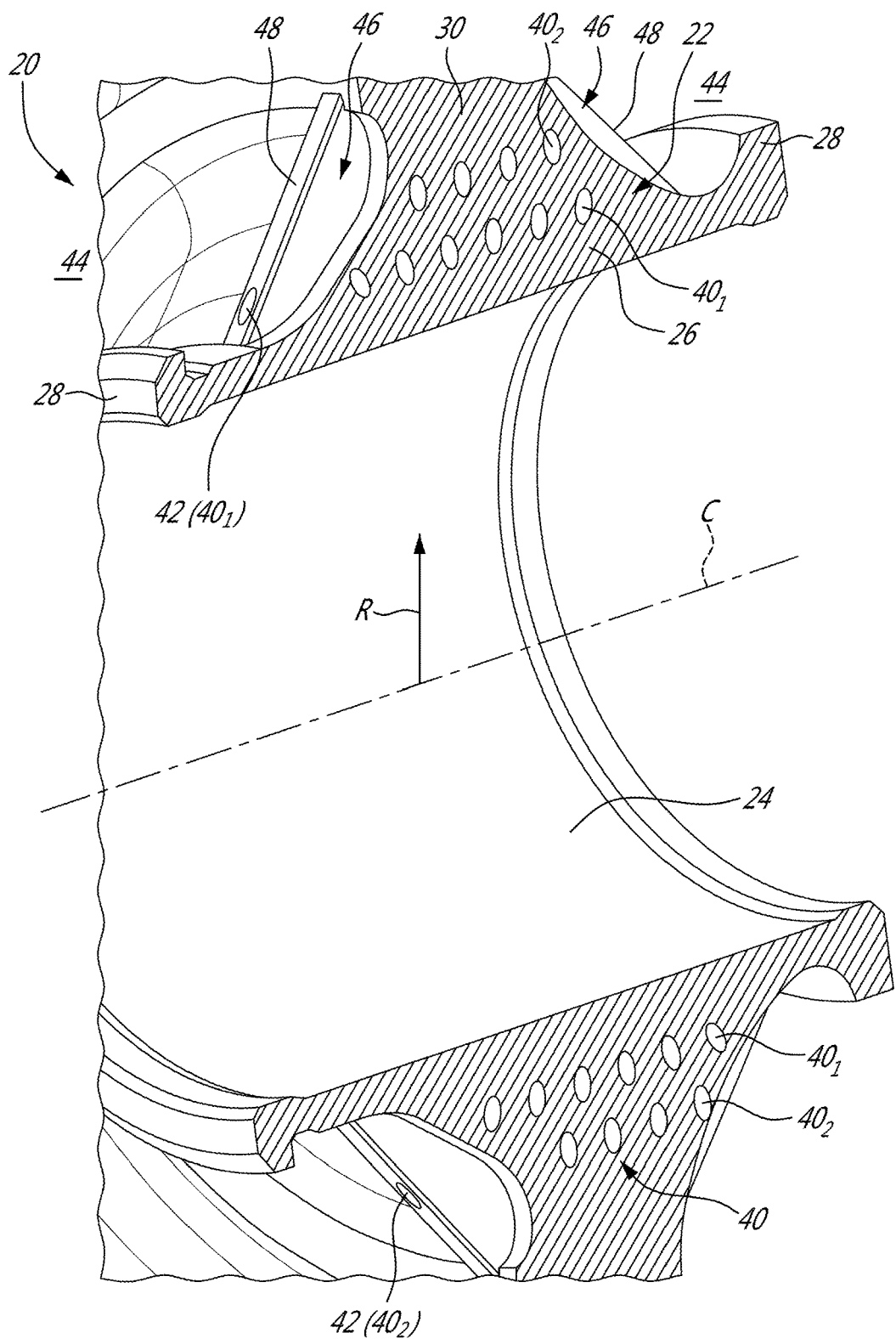
FIG. 2a is a schematic tridimensional view of part of a rotor disc of the gas turbine engine of FIG. 1, in accordance with a particular embodiment.
Figure 2B:
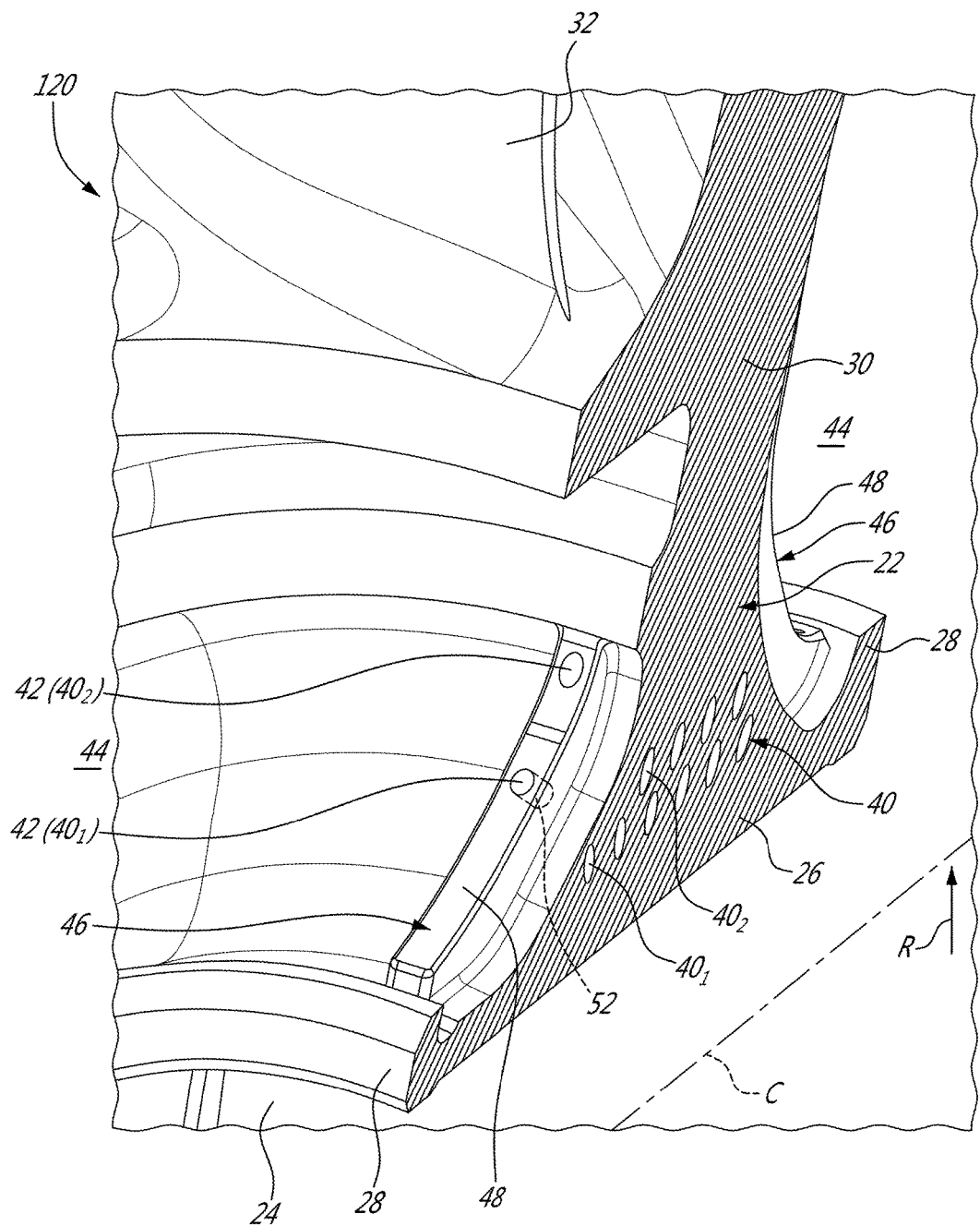
FIG. 2b is a schematic tridimensional view of part of a rotor disc of the gas turbine engine of FIG. 1, in accordance with another particular embodiment.

Referring to FIGS. 2a-2b, rotor discs 20, 120 are generally shown; the discs 20, 120 are similar and will be described together in the following. In a particular embodiment, the disc 20, 120 forms part of a compressor rotor 14' of the compressor section 14. Alternately, the disc 20, 120 can form part of any other rotor of the gas turbine engine 10, including, but not limited to, turbine and fan rotors 18', 12', and can form part of a rotor having any suitable rotor configuration, including, but not limited to, axial rotors and centrifugal rotors.

The disc 20, 120 includes an annular disc body 22 having a central axis C which, in use, corresponds to the central axis 11 of the engine 10. The disc body 22 includes an inner portion which may include a central opening 24 defined therethrough for receiving a rotatable shaft of the engine 10. The inner portion of the disc body 22 may include a cylindrical inner wall 26 defining a perimeter of the central opening 24, and includes front and aft rims 28 on opposed sides of the disc body 22. One or both of the rims 28 may be configured to engage suitable retention mechanism(s) for attaching the disc 20, 120 to the shaft. The disc body 22 includes an annular outer portion 30 extending radially outwardly from the inner portion (e.g., inner wall 26). In the embodiment show, the annular outer portion 30 is configured to engage the blades of the rotor, and accordingly may include blade slots for engaging the roots of separate blades or, in the embodiment shown, have blades 32 (see FIG. 2b)

integrally formed with the outer portion 30. It is understood that the particular configurations shown for the disc body 22 is exemplary only and that the disc body 22 can have any other suitable configuration.

The disc body 22 has multiple passages 40 ($40_1$, $40_2$ ... $40_i$ wherein i can be any suitable whole number) defined therethrough. The passages 40 each extend between two openings 42 (only one per passage visible in FIGS. 2a-2b) formed in the surface of the disc body 22 in communication with the environment of the disc 20, 120 (e.g. adjacent plenum). In the embodiments shown, the rotor is an axial compressor (FIG. 2a) or a non-axial compressor rotor, i.e. centrifugal or mixed flow rotor (FIG. 2b) configured as an integrally bladed rotor where the rotor disc 20, 120 is integral with the blades; the blades are uncooled, i.e. do not include cooling passages defined therein. The openings 42 defining the ends of the passages 40 are located on opposed sides of the disc body 22, and the passages 40 each provide a fluid communication between plenums 44 on opposed sides of the disc 20, 120 (or, in terms of position along the axis 11 of the engine 10, the environment in front of the disc 20, 120 and the environment aft of the disc 20). Air from one side of the disc 20, 120 can thus be circulated to the other side through the passages 40. The disc body 22 includes a plurality of circumferentially spaced apart ribs 46 extending radially outwardly from the inner wall 26 or wall of the plenum 44 and against the outer portion 30, each forming an inclined surface 48 inclined with respect to the central axis C and with respect to a radial direction R of the disc body 22. The inclined surface 48 may be straight (FIG. 2a) or curved (FIG. 2b). The openings 42 defining the opposed ends of the passages 40 are defined through a respective one of the ribs 46, in the inclined surfaces 48, for example to reduce local stresses on the openings 42. Other configurations are also possible.

In the embodiment of FIG. 2a, the openings 42 defining the ends of the passages are circumferentially spaced apart on the end surface of the disc body 22, for example regularly circumferentially spaced apart. For example, openings 42 of adjacent passages $40_1$, $40_2$ ... $40_i$ may be defined in diametrically opposed locations. In a particular embodiment, such a distribution of the openings 42 allows to reduce the unbalance in the material distribution of the disc body 22.

In a particular embodiment, the passages 40 allow for hot air to pass from the hot side to the cold side of the disc 20, 120 and/or cold air to pass from the cold side to the hot side of the disc 20, 120, so as to provide a more uniform temperature distribution across the disc body 22 in order to reduce thermal stresses. The passages 40 could be used, for example, to provide internal heating or cooling in some portions of the disc body 22 and/or to the blades.

In a particular embodiment where fluid communication through some or all of the passages 40 is not required, the openings 42 of these passages 40 may be closed with a suitable plug 52 (see FIG. 2b), for example made of a suitable plastic. The plug 52 can be held in place using any suitable means, including, but not limited to, retained by friction.

Figure 3:
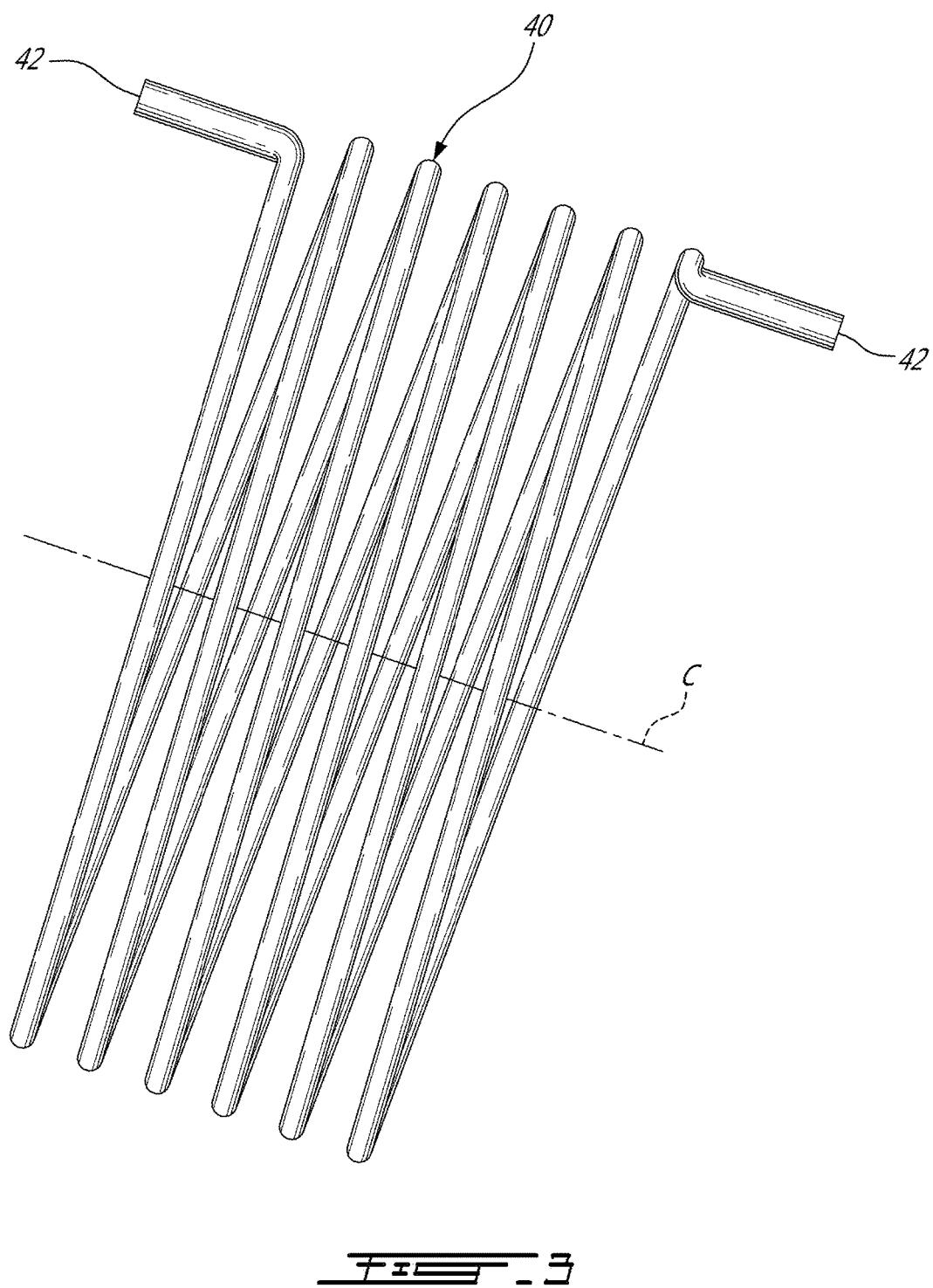
FIG. 3 is a schematic tridimensional view of a passage in the rotor disc of FIG. 2a or 2b.

Referring particularly to FIG. 3 where an exemplary shape for one of the passages 40 of the discs 20, 120 is shown, in a particular embodiment, each passage 40 forms a series of coils extending within the disc body 22, e.g. each passage 40 is defined as a connected series of spirals or rings so as to have a "spring shape". The coils of a same passage are spaced along a direction of the central axis C of the disc body 22. The passages are coiled around the central axis C. In the embodiment shown, each passage 40 follows a path remaining at a constant radial distance from the central axis C. Alternately, the radial distance may vary. The winding direction of the coils may be in direction of disc rotation to promote fluid communication through the passages 40 or opposite the direction of disc rotation to hinder fluid communication through the passages 40.

Referring back to FIGS. 2a-2b, in the embodiment shown, the passages 40 are spaced from each other along the radial direction R of the disc body 22. Accordingly, when viewed in a cross-section containing the central axis C (e.g., plane of the section shown in FIGS. 2a-2b), the passages form radially spaced rows of open cross-sections, which each row being defined by the coils of a same passage 40. The radial distance of the path of the coils from the central axis C differs between different passages $40_1$, $40_2$ ... $40_i$ so that the coils of different passages $40_1$, $40_2$ ... $40_i$ are radially spaced from each other while being coiled around the same central axis C. Alternately, two or more passages 40 can have coils with a same diameter alternating with one another along the direction of the central axis C. The distance between the coils of each passage 40 and between the adjacent passages $40_1$, $40_2$ ... $40_i$ may be regular or variable.

Figure 5:
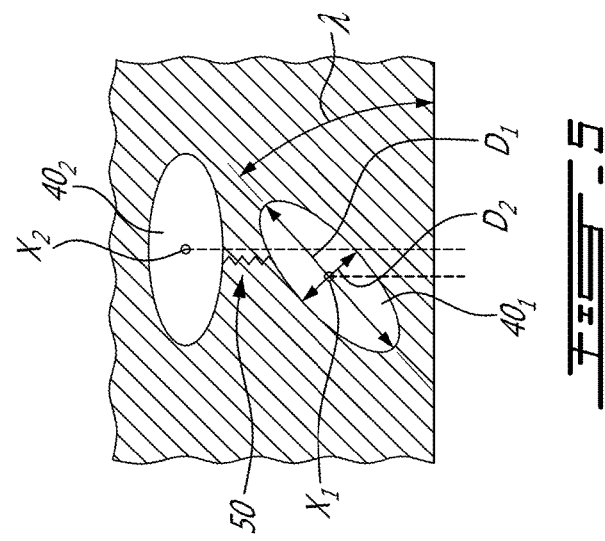
FIG. 5 is a schematic, enlarged cross-sectional view of part of the rotor disc of FIG. 4.
Figure 4:
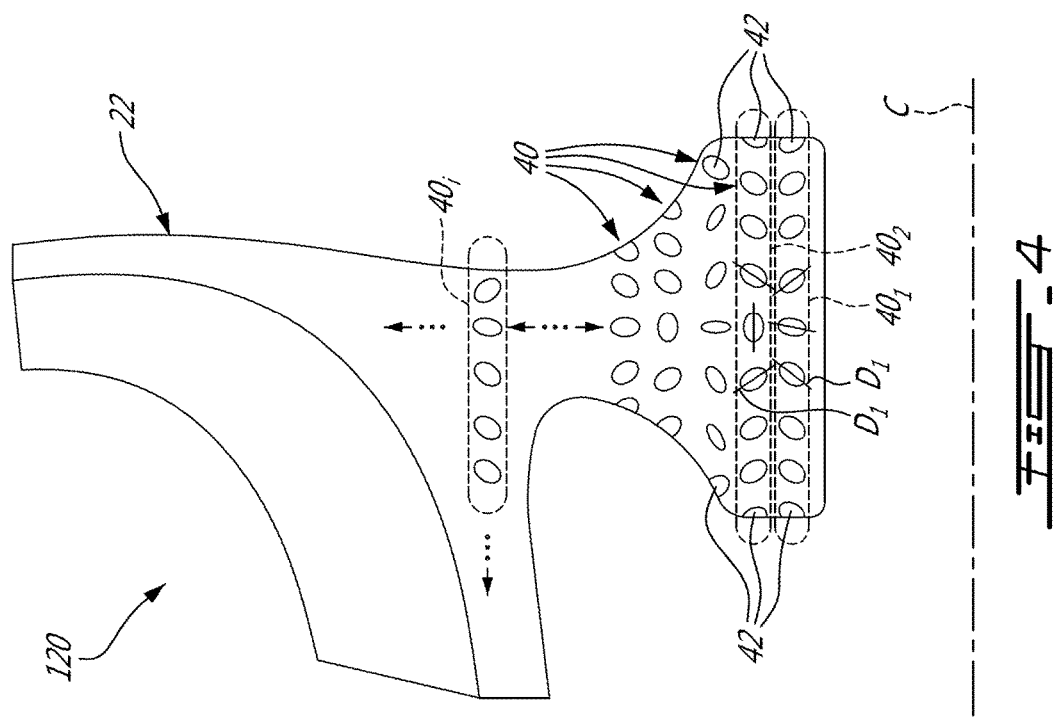
FIG. 4 is a schematic cross-sectional view of a rotor including a rotor disc such as shown in FIG. 2b, in accordance with a particular embodiment.

In a particular embodiment and as can be best seen in FIGS. 4-5, the passages 40 have elliptical cross-sections, with at least some of the adjacent coils having different orientations from one another. Referring to FIG. 5, each elliptical cross-section has a major axis $D_1$ and a minor axis $D_2$. An angle λ can be defined between the major axis $D_1$ of each cross-section and the central axis of the disc body 22 to characterize the orientation of the cross-section. Although FIG. 4 shows the disc 120, it is understood that the passages 40 through the disc 20 may be similarly configured.

In the embodiment shown and as seen in FIG. 4 (where the coil cross-sections in some portions of the disc body 22 are omitted for improved clarity), the cross-section of at least some, and in a particular embodiment all, of the adjacent coils of a same passage 40 (i.e., generally axially spaced coils) have major axes $D_1$ having different orientations from one another, i.e. the orientation of the cross-section of each passage 40 varies along its length as it coils around the central axis C of the disc body 22. Also, the cross-sections of at least some, and in a particular embodiment all, of the adjacent coils of different passages $40_1$, $40_2$ ... $40_i$ (i.e., radially spaced coils) have major axes $D_1$ have different orientations from one another. In other words, the angle λ (FIG. 5) of at least some, and in a particular embodiment all, of the adjacent coils differ from each other—while coils that are not adjacent each other can have a same angle λ. Moreover, the spacing between the coils can vary along the direction of the central axis C. The size of the open area of the coils of a same passage and/or of different passages may also vary.

In a particular embodiment, the major axes $D_1$ of the cross-sections of the coils are oriented so as to collectively provide a directional stiffness to the rotor disc 20, 120. Accordingly, the orientation of the major axes $D_1$ of the cross-section of the coils (i.e., angle λ) in a particular cross-sectional plane may be selected based on the results of a stress analysis of the disc body 22 in that cross-sectional plane. For example, in a particular embodiment the major and minor axes $D_1$, $D_2$ are generally aligned with the minimum and maximum principal strain directions in order to minimize the effect of the passages 40 on the rotor deflection.

Although shown with an elliptical cross-section, it is understood that the passages 40 can have any other suitable cross-sectional shape. A circular cross-section may be used, however a cross-section having a major axis $D_1$ (i.e. non axisymmetric) allows for configuring the coils with different orientations as described above.

In a particular embodiment and as can be best seen in FIG. 5, the adjacent passages $40_1$, $40_2$ ... $40_i$ are offset along the central axis C. When examined in a common plane containing the central axis C (e.g., plane of FIG. 5), the cross-sections of one passage $40_1$ have central points $X_1$ which are located between the central points $X_2$ of the cross-sections of the adjacent passage $40_2$—i.e. the cross-sections of adjacent radially spaced coils have central points which are offset along the central axis C. In other words, the open areas of the passages 40 form radially spaced rows of open areas offset along the central axis C, and in the cross-sectional plane containing the central axis C, the open areas of one row have central points aligned between the central points of the open areas of the adjacent row. In a particular embodiment, this offset allows for the passages 40 to act as a crack growth barrier relative to each other. An example of a crack 50 starting from one of the passages $40_1$ is shown; it can be seen that the crack 50 expanded to the adjacent passage $40_2$, and was then arrested by the opening formed by that adjacent passage $40_2$.

In a particular embodiment, the coils are also offset along the radial direction, i.e. when examined in a common plane containing the central axis C, the cross-sections of adjacent axially spaced coils (e.g., of a same passage 40) have central points which are located at different radial distances from the central axis C.

Although the passages 40 are shown as having a coiled shape, it is understood that the passages 40 can alternately have any other suitable configuration, including, but not limited to, any suitable configuration providing a fluid communication between the environment on opposed sides of the disc 20, 120. The passages 40 could extend parallel to the central axis C in whole or in part. The passages 40 could also extend circumferentially around a part or a whole of the perimeter of the disc body 22 without being shaped as coils. For example, the passages could be shaped so as to form lobes within the disc. However, configuration of the passages which is regularly distributed around the circumference of the disc 20, 120 (e.g. axisymmetric) is preferred to minimize rotational imbalance on the disc 20, 120.

In a particular embodiment, the passages 40 reduce the effective mass density of the disc 20, 120 sufficiently so that the disc 20, 120 may be considered non-critical (i.e. containable in a given application). The effective mass density is defined as the mass of the disc 20, 120 divided by the total volume enclosed by the exterior surfaces of the disc (i.e. the volume of the disc 20, 120 if the passages 40 were not present). In a particular embodiment, the passages 40 reduce the effective mass density of the disc 20, 120 by at least 10% of the material density of the disc 20, 120; in another particular embodiment, the passages 40 reduce the effective mass density of the disc 20, 120 by at least 30% of the material density of the disc 20, 120; in another particular embodiment, the passages 40 reduce the effective mass density of the disc 20, 120 by at least 70% of the material density of the disc 20, 120, where the material density refers to the density of the solid material forming the disc body 22. In other words, a ratio can be defined between the effective mass density D of the disc 20, 120 and the material density d of the solid material (e.g. metal) forming the disc body 22. In a particular embodiment, the ratio D/d is at most 0,9; in another particular embodiment, the ratio D/d is at most 0,7; in another particular embodiment, the ratio D/d is at most 0,3. Other values are also possible.

In a particular embodiment and as can be best seen in FIG. 6, the passages 40 have a packing density defined by a ratio between the open area of the passages $A_p$ and the solid area $A_s$ (e.g. metal area) in a portion or the whole of a particular cross-sectional plane of the disc 20, 120, i.e. the packing density corresponds to $A_p/A_s$. In a particular embodiment, in a portion or the whole of a cross-sectional plane containing the central axis C (e.g. plane of FIGS. 4-5), the packing density of the passages $A_p/A_s$ is at least 0.1; in a particular embodiment, in a portion or the whole of that same cross-sectional plane the packing density of the passages $A_p/A_s$ is at least 0.3; in a particular embodiment, in a portion or the whole of that same cross-sectional plane the packing density of the passages $A_p/A_s$ is at least 0.7. In a particular embodiment, in a portion or the whole of a cross-sectional plane perpendicular to the central axis C, the packing density of the passages $A_p/A_s$ is at least 0.1; in a particular embodiment, in a portion or the whole of that same cross-sectional plane the packing density of the passages $A_p/A_s$ is at least 0.3; in a particular embodiment, in a portion or the whole of that same cross-sectional plane the packing density of the passages $A_p/A_s$ is at least 0.7. The packing density of the passages $A_p/A_s$ in a portion or the whole of other cross-sectional planes may also be at least 0.1, at least 0.3 or at least 0.7, including, but not limited to, in a cross-sectional plane extending perpendicularly to the central axes of a majority or all of the passages 40.

It is understood that any of the effective mass volume reduction values provided above can be combined with any or any combination of the packing density values provided above.

In a particular embodiment, the passages 40 are distributed within the whole of the disc body 22, for example regularly spaced apart along the radial direction R from a location adjacent the central opening 24 to a location adjacent the outer perimeter of the disc body 22.

In a particular embodiment, the passages 40 allow inspection of the internal passage walls using a borescope, which may allow for detection of cracks in the disc body 22.

In a particular embodiment, the rotor disc 20, 120 is manufactured by forming the disc body 22 using an additive manufacturing method, for example from a suitable metal powder such as a titanium powder. Manufacturing of the disc body 22 includes forming the passages 40 as the disc body 22 is being formed. The use of additive manufacturing allows for the passages 40 to be formed with a shape which could be difficult or impossible to obtain by machining a solid piece (e.g., coils). In a particular embodiment, after the disc body 22 is formed, a fluid containing abrasive finishing material is circulated through the passages 40 to improve their surface finish (e.g. extrude honing process), for example to reduce crack formation during use of the rotor.

In particular embodiment, the passages 40 are submitted to a hot isostatic pressing (HIP) process, so that the surface stress at the passages 40 becomes compressive in nature; this may improve the fatigue capability of the rotor disc 20, 120.

In a particular embodiment, the passages 40 occupying a significant portion of the volume of the disc body 22 allow for the mass of the rotor to be sufficiently low so that the rotor is characterized as a non-critical rotating component for given design conditions (e.g. rotational speed, capacity of retention of the surrounding casing). Accordingly, in a particular embodiment the presence of the passages 40 allow for the mass of the rotor to be sufficiently low so that upon rotor burst, the released rotor fragments would be sufficiently light and/or impact with a sufficiently low energy so as to be containable by the surrounding engine casing. In a particular embodiment, the same rotor without the passages 40 would be characterized as a critical rotating component.

In addition to their impact on the rotor mass, in a particular embodiment the adjacent passages $40_1, 40_2 \ldots 40_i$ with offset cross-sections further help characterize the rotor as a non-critical rotating component because of the crack growth barrier effect as described above, which may increase the fatigue life and/or the resistance to crack propagation of the disc body 22.

In a particular embodiment, the non-critical rotor disc 20, 120 with the passages 40 can be made of materials meeting less stringent mechanical property requirements as compared to a part characterized as a critical rotating component, which may allow for a reduction in material and characterization costs. In a particular embodiment, the disc 20, 120 can be made of a material which is considered adequate for a static engine component but not characterized for use in a critical rotating component.

In an alternate embodiment, the passages 40 may be formed through static elements of the engine 10, for example parts of engine casing. The passages 40 may allow for weight reduction of the static elements and/or improved fatigue life and/or improved resistance to crack propagation.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A rotor disc for a gas turbine engine, the rotor disc comprising an annular disc body configured to support a circumferential array of blades, the disc body having a plurality of passages defined therethrough forming coils within the disc body, the passages coiled around a central axis of the disc body.

2. The rotor disc as defined in claim 1, wherein the passages have a packing density of at least 0.1 in a cross-sectional plane of the disc body, the cross-sectional plane containing the central axis and extending in a radial direction from the central axis, the packing density defined by a ratio between an open area of the passages and a solid area of the disc in the cross-sectional plane.

3. The rotor disc as defined in claim 1, wherein the passages are in fluid communication with an environment around the rotor disc through openings formed in a corresponding surface of the disc body at opposed ends of the passages.

4. The rotor disc as defined in claim 1, wherein the passages have elliptical cross-sections, major axes of the elliptical cross-sections of adjacent ones of the passages having different orientations from one another.

5. The rotor disc as defined in claim 1, wherein the passages have elliptical cross-sections, major axes of the elliptical cross-sections of adjacent ones of the coils of a same one of the passages having different orientations from one another.

6. The rotor disc as defined in claim 1, wherein the coils of a same one of the passages are spaced along a central axis of the disc body, and the coils of adjacent ones of the passages are spaced from each other along a radial direction of the disc body.

7. The rotor disc as defined in claim 6, wherein the adjacent passages are offset along the central axis so that in a plane containing the central axis, cross-sections of the coils of a first one of the passages have central points aligned between the central points of the cross-sections of the coils of a second one of the passages adjacent the first passage.

8. A non-axial integrally bladed rotor including the rotor disc as defined in claim 1 and an array of uncooled blades integrally connected to the rotor disc.

9. A rotor disc for a gas turbine engine, the rotor disc comprising an annular disc body configured to support a circumferential array of blades, the disc body having a plurality of passages defined therethrough, the passages having a packing density of at least 0.1 in a cross-sectional plane of the disc body, the cross-sectional plane containing the central axis and extending in a radial direction from the central axis, the packing density defined by a ratio between an open area of the passages and a solid area of the disc in the cross-sectional plane, wherein the open areas have elliptical cross-sections, major axes of the elliptical cross-sections of adjacent ones of the open areas having different orientations from one another.

10. The rotor disc as defined in claim 9, wherein the packing density of the passages is at least 0.3.

11. The rotor disc as defined in claim 9, wherein the packing density of the passages is at least 0.7.

12. The rotor disc as defined in claim 9, wherein the passages are in fluid communication with an environment around the rotor through openings formed in a corresponding surface of the disc body at opposed ends of the passages.

13. The rotor disc as defined in claim 9, wherein the passages extend at least in part around a circumference of the disc.

14. The rotor disc as defined in claim 9, wherein the open areas of adjacent passages form radially spaced rows of open areas offset along the central axis so that in the cross-sectional plane, the open areas of one of the rows have central points aligned between the central points of the open areas of an adjacent one of the rows.

15. A rotor disc for a gas turbine engine, the rotor disc comprising an annular disc body configured to support a circumferential array of blades, the disc body having a plurality of passages defined therethrough, the passages having a packing density of at least 0.1 in a cross-sectional plane of the disc body, the cross-sectional plane containing the central axis and extending in a radial direction from the central axis, the packing density defined by a ratio between an open area of the passages and a solid area of the disc in the cross-sectional plane, wherein the open areas of adjacent passages form radially spaced rows of open areas offset along the central axis so that in the cross-sectional plane, the open areas of one of the rows have central points aligned between the central points of the open areas of an adjacent one of the rows.

* * * * *